United States Patent [19]
Eastman et al.

[11] Patent Number: 5,714,750
[45] Date of Patent: Feb. 3, 1998

[54] BAR CODE SCANNING AND READING APPARATUS AND DIFFRACTIVE LIGHT COLLECTION DEVICE SUITABLE FOR USE THEREIN.

[75] Inventors: Jay M. Eastman, Pittsford; Anna M. Quinn; Kevin Whitcomb, both of Rochester; James M. Zavislan, Pittsford, all of N.Y.

[73] Assignee: PSC Inc., Webster, N.Y.

[21] Appl. No.: 320,888

[22] Filed: Oct. 5, 1994

Related U.S. Application Data

[63] Continuation-in-part of Ser. No. 138,313, Oct. 18, 1993, Pat. No. 5,422,472, which is a continuation-in-part of Ser. No. 985,371, Dec. 4, 1992, abandoned.

[51] Int. Cl.[6] .................................................. G06K 7/10
[52] U.S. Cl. .................................... 235/462; 235/454
[58] Field of Search ............................... 359/572, 573, 359/574, 575; 385/14, 462, 472, 454, 457; 250/16, 227.3, 227.31, 227.32, 226

[56] References Cited

U.S. PATENT DOCUMENTS

| | | | |
|---|---|---|---|
| 4,371,897 | 2/1983 | Kramer | 358/474 |
| 4,886,341 | 12/1989 | Oishi | 359/575 |
| 5,146,080 | 9/1992 | Opheij | 250/216 |
| 5,210,404 | 5/1993 | Cush | 250/216 |
| 5,268,985 | 12/1993 | Ando | 385/129 |
| 5,367,151 | 11/1994 | Dvorkis | 235/472 |
| 5,386,319 | 1/1995 | Whitney | 359/575 |
| 5,422,472 | 6/1995 | Zavislan | 235/472 |

OTHER PUBLICATIONS

Effects of misalignment on real image holographic measurement, Gary Ross & John Watson, SPIE vol. 1732 Holographics Int. '92 pp. 198–208.

Holographic Scanning, Leo Beiser, Wiley & Sons Inc. 1988 pp. 40,127–129.

Bandwidth of holographic optical elements, Thomas Stone & Nicholas George, Sep. 1982, vol. 7 No. 9 Optics Letters pp. 445–447.

The Bell System Technical Journal–Coupled Wave Theory for Thick Hologram Gratings, by Herwig Kogelnik; vol. 48, Nov. 1969, No. 9 pp. 2909–2947.

The diffraction efficiency of multiple grating hoilographic fan–out elements –Paul S. Cawte –SPIE vol. 1732 Holographics International '92 pp. 36–37,45.

Optical Scanning by Gerald F. Marshall, Marcel Decker, Inc, New York 1991, pp. 194–195, 622–624.

Primary Examiner—Donald T. Hajec
Assistant Examiner—Karl Frech
Attorney, Agent, or Firm—Foley & Lardner

[57] ABSTRACT

A miniature scan engine for scanning a beam of monochromatic (laser) light across a bar code and receiving return light at a detector that provides electrical signals representing the code, utilizes an integral assembly of a laser (laser diode), the detector and a light collector mounted on flexures and rotated so as to scan the beam and receive the return light from the code. The collector is a body of material transmissive at the laser wavelength. The body presents an orientable surface so that the return light is incident at or close to perpendicular to the surface. In the body, parallel to the surface, is a volume hologram grating having Bragg planes arranged in rings around a center region in alignment with the detector. The angles of the Bragg planes vary progressively and decreases in a direction toward the center region so that light incident on the collector at angles of incidence, which vary from perpendicular to the surface by about + or −5°, are diffracted and propagate by guided mode propagation, including reflections at the internal surfaces of the body and transmission through the grating (because the light propagating along the paths intersects the grating Bragg planes off Bragg that is at an angle other than the Bragg angle) to the detector. Efficient collection of the light returned from the bar code symbol is obtained. The entire scan engine may occupy a volume of less than 1.25 cubic inch, thereby enabling bar code scanning and reading facilities in devices such as hand-held data collection terminals where space is at a premium.

33 Claims, 9 Drawing Sheets

BAR CODE SCANNING AND READING APPARATUS AND DIFFRACTIVE LIGHT COLLECTION DEVICE SUITABLE FOR USE THEREIN.

CROSS-REFERENCE

This is a continuation-in-part of application Ser. No. 08/138,313, filed Oct. 18, 1993, now U.S. Pat. No. 5,422,472 issued Jun. 6, 1995, which is a continuation-in-part of application Ser. No. 07/985,371 filed Dec. 4, 1992 now abandoned, both of which are incorporated herein by reference.

DESCRIPTION

The present invention provides improvement to bar code scanning and reading apparatus and light reception and collection devices.

The present invention provides an improved light collection optical device or optic and improved bar code scanning and reading apparatus which incorporates the optic.

The present invention is especially suitable for use in optical apparatus such as bar code scanners and readers that require minimal space or where minimal space, for example, approximately one cubic inch in volume, is available for the bar code scanning and reading facilities. The invention provides improvements in diffractive light collection devices, especially suitable for use in bar code readers and scanners such as used in data collection terminals or in various hand-held portable applications. The invention also enables the collection of light, for example, light returned from a reflective optical symbol, such as a bar code, to be collected with directional sensitivity thereby excluding extraneous light that can produce noise in the electrical signal representing the code.

Such directivity and miniaturization in the size of the light collecting device, and the bar code apparatus containing that device is obtained, in accordance with the invention, through the use of a volume grating, which is desirably a hologram grating, contained within a body of light transmissive material such as a plate, which may be a fraction of a cubic inch in volume. The collection efficiency of the device and its directivity is obtained by forming the grating with fringe planes, also known as Bragg planes, which define Bragg angles with respect to the direction of light incident on the body. The Bragg angles vary progressively towards a collection region, thereby providing guided mode propagating paths within the body irrespective of the distance along the body from the collecting region, which paths terminate at a region where a photodetector is located.

A unitary assembly including the collection optic, a laser and a detector may be rotatably mounted and oscillated in order to scan the laser beam across a field of view where an object to be scanned (e.g. a bar code) may be located. The return light is collected by the optic and presented to the detector in the collection region defined by the optic. The fringe (Bragg) planes of the grating may be arranged in concentric rings about the region where the light is collected. A pair of sets of such rings are disposed side by side in the body of the optic, and each set collects and presents the collected illumination at a detector in alignment with the center of the ring.

Collection optics and bar code scanning devices are described in the above-referenced applications utilizing diffractive elements for guiding and concentrating light, especially light returned from a bar code. The collection of light, discovered in accordance with the invention, may be improved through the use of volume gratings such as holographic gratings having fringes also known as Bragg planes, the inclination of which varies progressively with respect to a region where the light is to be concentrated and collected. Then, light incident on the optic both close to the collection region and further therefrom, is trapped by diffraction within the optic and propagates over different paths to the collection region, thereby minimizing the amount of light lost and discriminating against light incident on the optic from outside of a field of view where the object of interest, such as a symbol scanned, is located.

Volume gratings, in particular gratings created by holographic recording (hologram gratings), are described, insofar as their theory of operation and construction is concerned, in known publications. The seminal article is H. P. Kogelnick, Coupled Wave Theory For Thick Hologram Gratings, which appeared in the Bell System Technical Journal, Vol. 48, No. 9, November 1969 on page 2909 et seq. Other articles on such holographic elements and gratings and their theory of operation are T. Stone and N. George, Bandwidth Of Holographic Optical Elements, Optics Letters, September 1982, Vol 7, No. 9, page 445, et seq. and P. S. Cawte, The Diffraction Efficiency Of Multiple Grating Holographic Fan Out Elements, SPIE, Vol. 1732, Holographics International, 92, page 36. Fabrication of hologram gratings is the subject of articles by Dickson and Sincerbox in Optical Scanning, G. F. Marshall, Editor, Marcel Dekker, Inc., New York publisher (1991), G. Ross and J. Watson, Effects of Misalignment On Real Image Holographic Measurement, SPIE, Vol. 1732, Holographics International '92 (1992) and Holographic Scanning by L. Beiser, John Wiley & Sons (1988). The Beiser and Marshall texts discuss the Bragg angle, which is equal to the angle of incidence and diffraction from the grating planes and is defined as sin $\theta_b = (\frac{1}{2})(\lambda/d)$ where $\theta_b$ is the Bragg angle, $\lambda$ is the wavelength of the monochromatic light incident on the grating and d is the grating pitch or distance between the lines where the fringes or Bragg planes are located. These planes are regions of constant index of refraction formed photo-optically in the grating as by interferometric exposure of a film of dichromated gelatin or a photosensitive polymer.

Orienting the fringes or Bragg planes of the grating at progressively varying angles, even though the fringes may be along lines or circles of constant spacing or pitch, has been found to enhance the efficiency of collection and to be consistent with a scan engine of miniature size, which nevertheless is able to receive sufficient light to read optical symbols such as bar codes over a reasonable range in front of the scanner.

Accordingly, it is the principal object of the present invention to provide improved devices and apparatus for collecting light, especially light returned upon scanning of an object such as a bar code or other optical symbol and trapping and guiding the light to a collection region where the light may be translated into signals representing the symbol.

It is a further object of the present invention to provide improved collecting optics and scan engines incorporating the same, which may be miniature in size and sufficiently small to be received in portable data collection equipment such as hand-held laser scanners and terminals.

It is a still further object of the present invention to provide apparatus and devices for light collection and scanning, which are rugged and reliable and which contain parts tolerant of stresses accompanying their use in portable, hand-held equipment.

It is a still further object of the present invention to provide scan engines and light collection devices that may be contained in an extremely small space, about one cubic inch.

Briefly described, a scan engine for scanning an optical beam over a field of view that can contain a data representing symbol may be provided in accordance with the invention with an optic that collects return light from the symbol and translates the light into data representing electrical signals. The optic has a volume grating contained therein with fringe planes oriented at progressively varying angles, which define progressively varying Bragg angles and which diffract the return light along different paths. These paths propagate to a common collection region even though the light is incident on the collector at different distances from the collection region. A photodetector may be disposed at the collection region and a monochromatic source of a wavelength at which light is diffracted at the Bragg angles is provided. The collector may be integrated with the collection optic and the photodetector as a unitary assembly and made rotatable to provide the scanning beam.

BRIEF DESCRIPTION OF THE DRAWINGS

The foregoing and other objects, features and advantages of the invention, as well as presently preferred embodiments thereof, will become more apparent from a reading of the following description in connection with the accompanying drawings in which.

DETAILED DESCRIPTION

Figure 1:
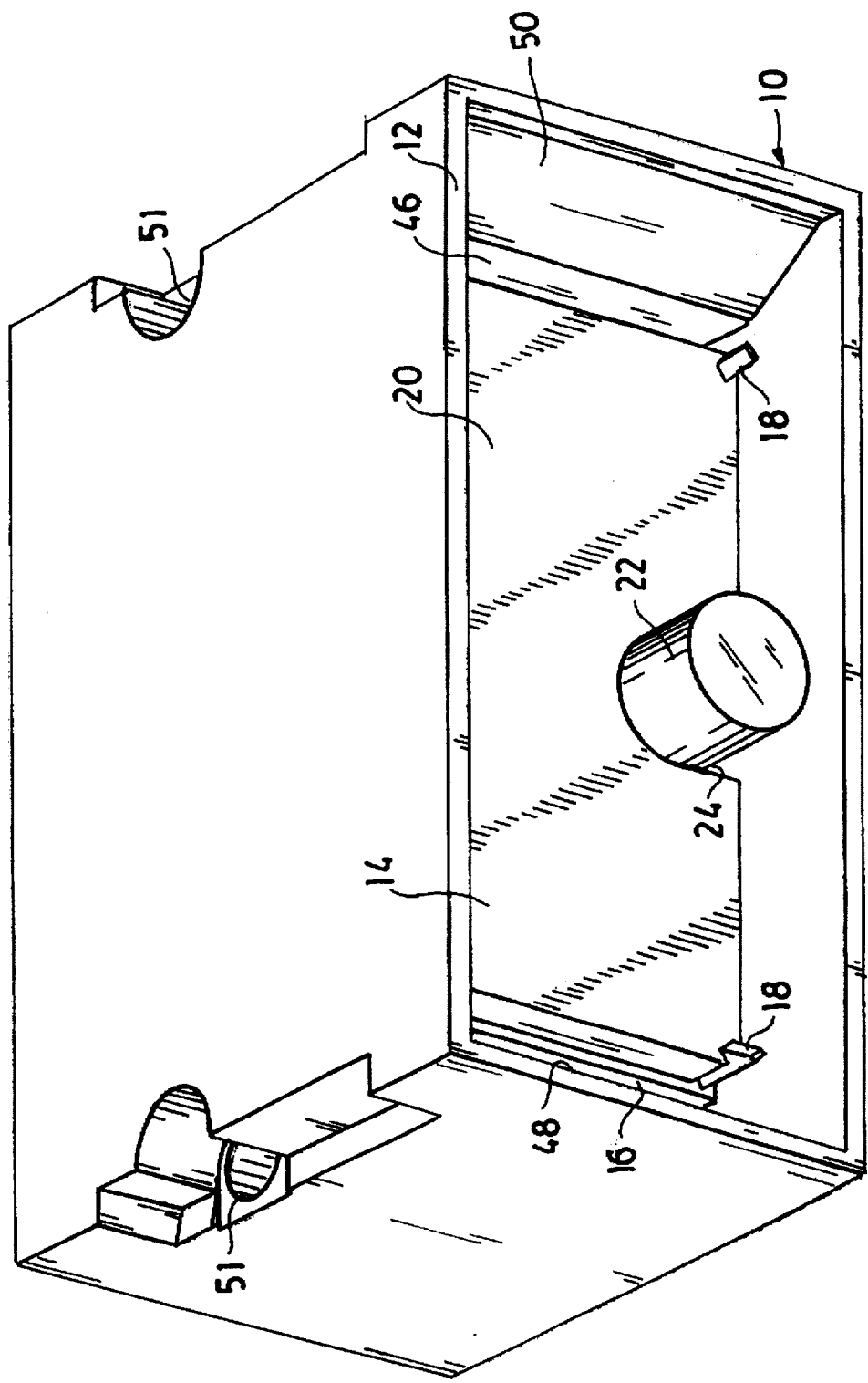
FIG. 1 is a perspective view of a scan engine embodying the invention.
Figure 2:
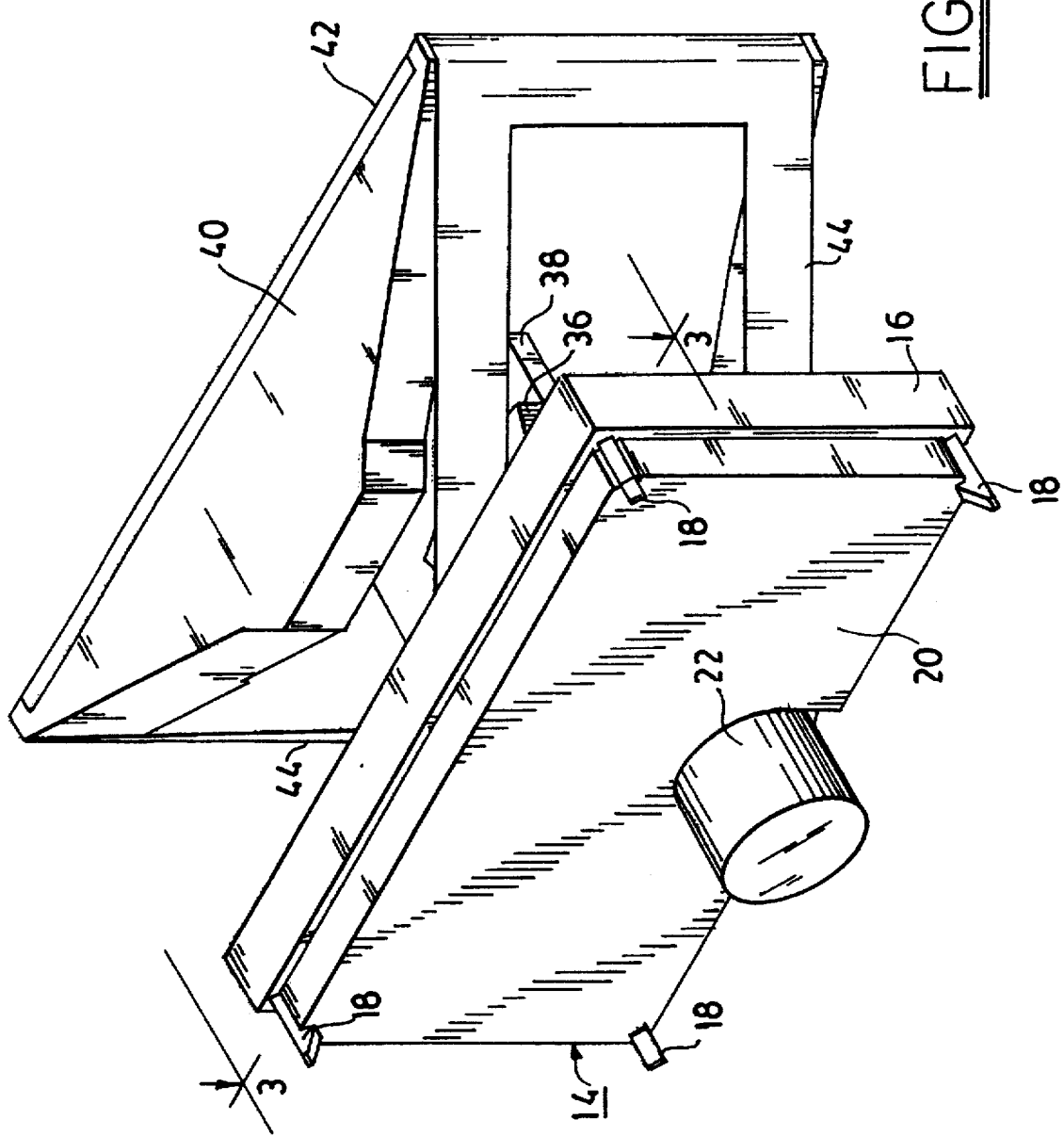
FIG. 2 is a perspective view of the rotatable (rotor) assembly and its flexural support, which assembly and support are in the scan engine illustrated in FIG. 1.
Figure 3:
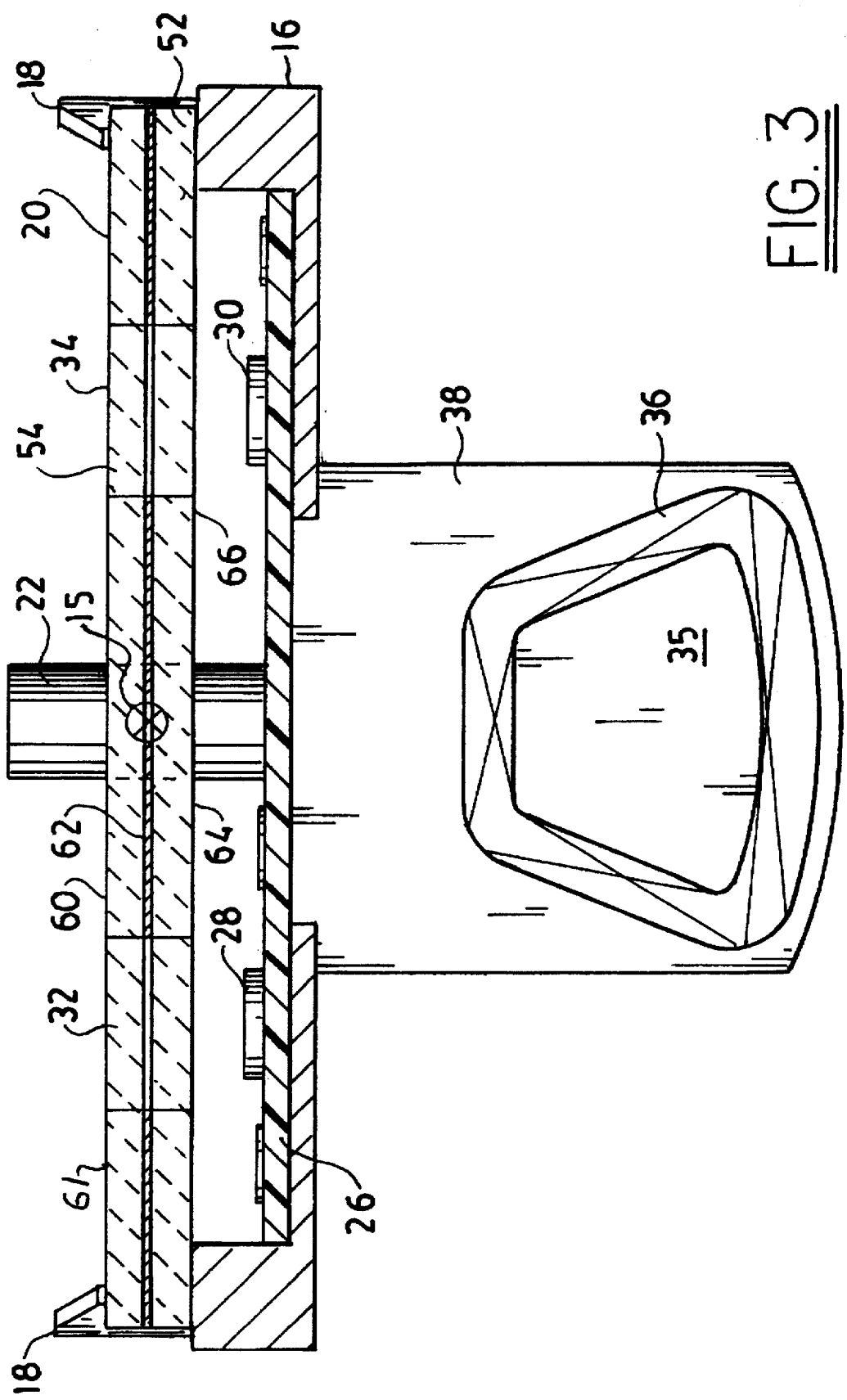
FIG. 3 is a sectional view of the rotor assembly, the view being in a generally horizontal plane in the direction of the arrows 3—3 in FIG. 2.

Referring to FIG. 1 there is shown a housing or frame 10 rectangular on all sides and which is open in the front side 12 thereof, exposing a rotatable (rotor) assembly 14. This rotor assembly 14, as shown in FIGS. 2 and 3, is made up of a frame 16 having flexible clips 18 at the corners thereof. A collection optic 20 having chamfered corners is held on the frame 16 in alignment therewith by the clips 18.

A circuit board 26 is located in the frame 16 below a plate constituting the collection optic 20. A laser diode assembly 22 mounted in the frame 16, projects through a notch 24 into one edge of the optic 20. Photodetectors 28 and 30 are mounted on this circuit board 26 in alignment with a pair of center regions 32 and 34 of the optic 20. Also mounted on this circuit board 26 may be other chips containing circuits for creating a digital representation of the signal incident upon the detectors. A post 38 of generally rectangular shape projects rearwardly from the frame 16. The post 38 carries a bobbin 35 around which an armature coil 36 is wound. This post 38 and bobbin 35 extend into a stator assembly 40 (FIG. 2), which includes a circuit board 42. The stator assembly is mounted in the housing 10 with the rotor assembly to which it is connected by flexures 44.

The flexures 44 support the assembly 14 from the stator 40 and enable the rotor assembly 14 to pivot about an axis indicated at 15 in FIG. 3. Mounted on the stator board 42 are chips and circuits for operating the laser in the laser diode assembly 22, and for switching current to the armature coil 36. Connections to the coil 36 and the laser are made to these circuits on stator board 42 via conductive traces on the flexures 44.

The collector 20 is less wide than the space between the internal side walls 46 and 48 of the housing 10. These walls have flared regions 50 that taper outwardly to the front opening 12 to provide space for the assembly 14 to rotate about the axis 15. The scan engine may be mounted, in a scanner or terminal or other apparatus utilizing it, by bolts or screws in brackets or holes 51.

The entire scan engine may be 1.5 inch long, ¾ inch high and one inch deep, thereby occupying a volume of less than 1.25 cubic inch. The collector plate may be approximately 0.079" in thickness and has a substrate plate 52 and a cover plate 54. A layer of photosensitive material, such as a film of dichromated gelatin on the surface of the plate 52 is several, say 4 microns in thickness, and the hologram grating 62 is formed therein. This hologram grating is made by means of the arrangement described hereinafter in connection with FIGS. 7 through 11.

The outer or forward surface 60 of the optic desirably has a dielectric filter coating layer 61 thereon, which is highly transmissive for collimated light incident on the surface 60 but reflective for light directed to the opposite side of this surface, internally within the plate 20. A highly reflective layer or coating 64, for example, of gold, is applied to the inner surface 66 of the collection optic plate.

Figure 4:
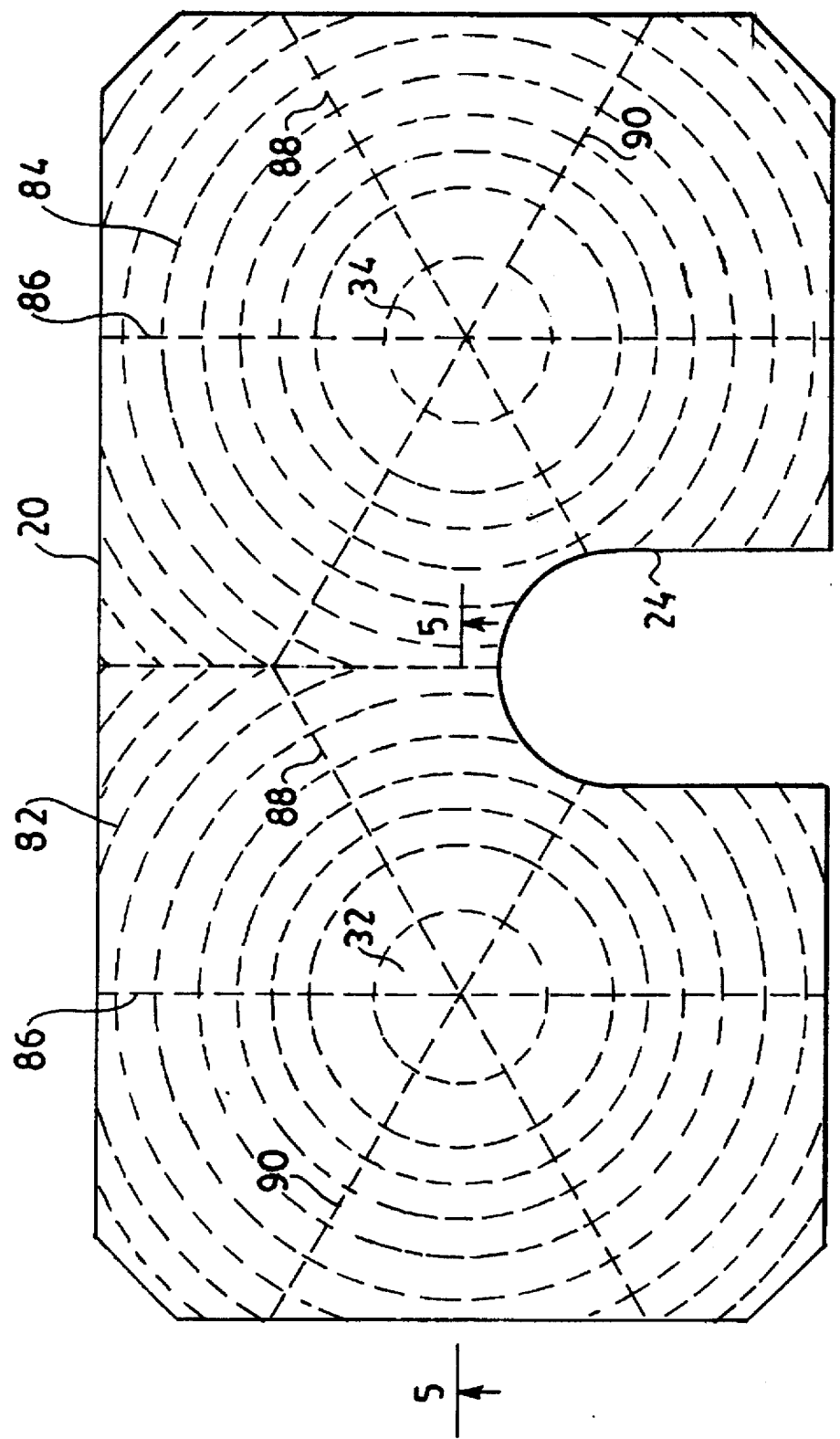
FIG. 4 is a plan view of the collection optic from the forward surface facing upwardly from the scan engine as shown in FIGS. 1, 2 and 3.
Figure 5:
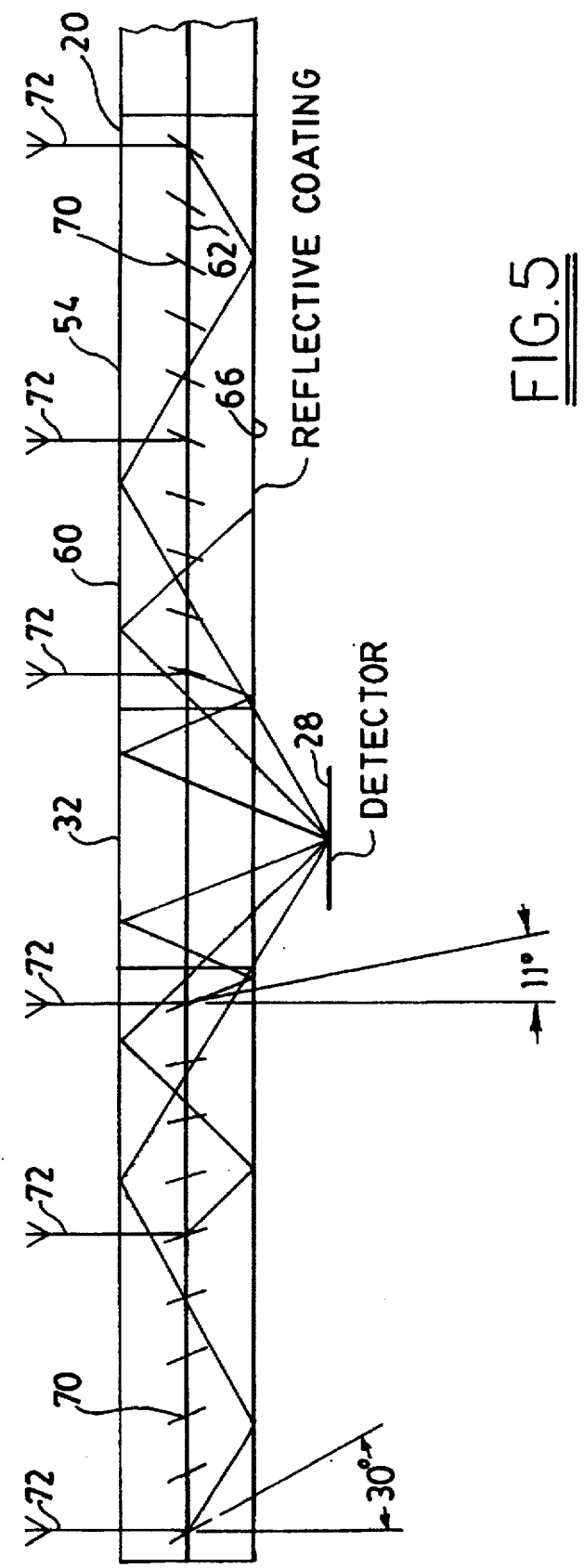
FIG. 5 is a schematic diagram of the optic in cross-section. The cross-section being along the line 5—5 in FIG. 4.

Referring to FIGS. 4 and 5, there is shown two sets of circular rings defining the location of the fringes or Bragg planes 70 of the grating 62. These circular lines define the circular central regions 32 and 34 in alignment with the detectors 28 and 30, respectively. The light returned or reflected from the bar code is indicated schematically by rays 72, which are incident on the forward surface 60 and extend over the entire surface. The light, even though incident at different locations with respect to the regions 32 and 34, is collected at the detectors to a maximum extent thereby providing for efficient collection of light. Maximizing the electric signal corresponding to the light by optoelectric transduction in the detectors 28 and 30.

Figure 12:
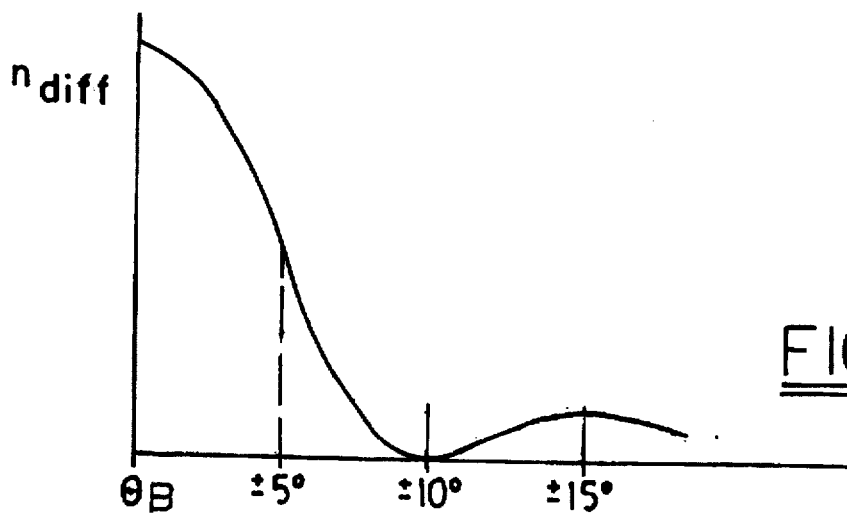
FIG. 12 is a curve of the variation in diffraction efficiency with angle and shows that the efficiency and therefore the light diffracted by the volume grating for off-Bragg angles is minimum.

The Bragg plane angles vary progressively and increase in a direction radially outward from the regions 32 and 34. The angles of the Bragg plane are obtained by laying out ray paths including reflections at the surfaces 60 and 66, which reflections are enhanced by the reflectivity of the layers 61 and 64 on these surfaces. Thus, the most radially outward rays are incident on the Bragg planes at the Bragg angle of 30° and are diffracted by a diffraction angle also equal to 30°. Rays diffracted at 30° from the outer ring are reflected on the inner surface 66 and proceed to propagate along a path through the grating 62. Transmission "off-Bragg" (more than 10° from the Bragg angle) dominates over diffraction. As shown in FIG. 12 when more than 10° off the Bragg angle, 95% (ninety-five percent) or more of the light incident on the Bragg planes is transmitted therethrough. This is because in a volume hologram the diffraction efficiency at the Bragg angle condition is almost 100% but decreases rapidly when incidence is off the Bragg angle (the so-called off-Bragg condition). Accordingly, the diffraction mode in the optic 20 is a guided wave mode that concentrates the light in the region where the detectors are located.

The reduction in efficiency of diffraction off-Bragg provides a high degree of directional sensitivity to the scan engine. Thus, if the surface 60 facing the object being scanned is not directly in front of the scan engine so that the return light is incident on the collection optic at more than 10° off the Bragg angle, the light is not diffracted in the collection optic and does not propagate to the detectors. There are two sets of gratings 82 and 84, each of lines in the form of rings around the centers 32 and 34. The use of two sets of gratings is preferred in order to enhance the efficiency of light collection and prevent the need for the light to propagate within the grating over extended distances. Each reflection reduces the collection efficiency because of loss of some light at the surfaces 60 and 66. Thus, minimization of the propagating paths is desirable.

The plan view of FIG. 4 illustrates diametric lines 86, 88 and 90 set 60° apart and crossing through the middle of the center regions 32 and 34. These lines indicate sectors of the grating fabricated individually. In other words, the grating is generated in 60° segments to form the circular ring grating lines as shown in FIG. 4.

Figure 6:
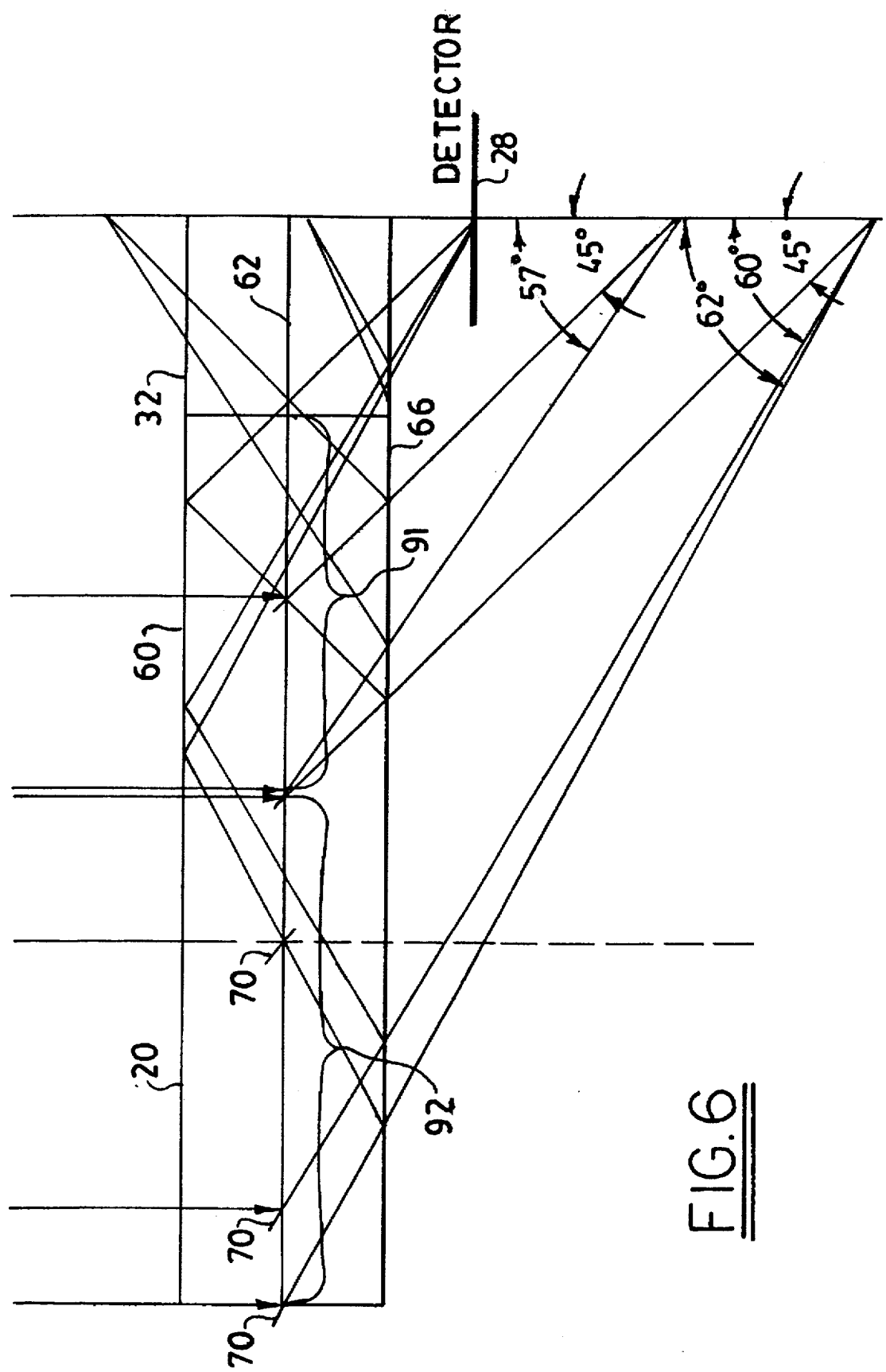
FIG. 6 is a schematic diagram similar to FIG. 5 but of one-half of the cross-section of the collection optic having a grating the fringe or Bragg planes of which are arranged in accordance with another embodiment of the invention.

The rate of change in inclination of the grating lines may vary differently in inner and outer groups 91 and 92 as shown in FIG. 6 when it is desired (e.g. for reason of cost) not to provide reflective layers on the forward and rear surfaces 60 and 66 of the collector plate 20. The critical angle for internal total reflection of the plate is about 45°. Accordingly, the outer group 92 of Bragg planes are oriented so that they vary at a faster rate than the inner group of planes 91. The manner in which these groups are constructed is illustrated in FIG. 6. Again, the construction is to maintain the internal angles of incidence at least 45° so that the paths of propagation all coalesce at the detector 28 or 30.

The material of the plate also determines the critical angles of reflection at the interface surfaces 60 and 66. Presently, preferable is the use of whitewater glass appearing translucent under white light illumination but transmissive for red light, such as produced by the laser diode in the assembly 22 (0.67 microns wavelength).

Figure 7:
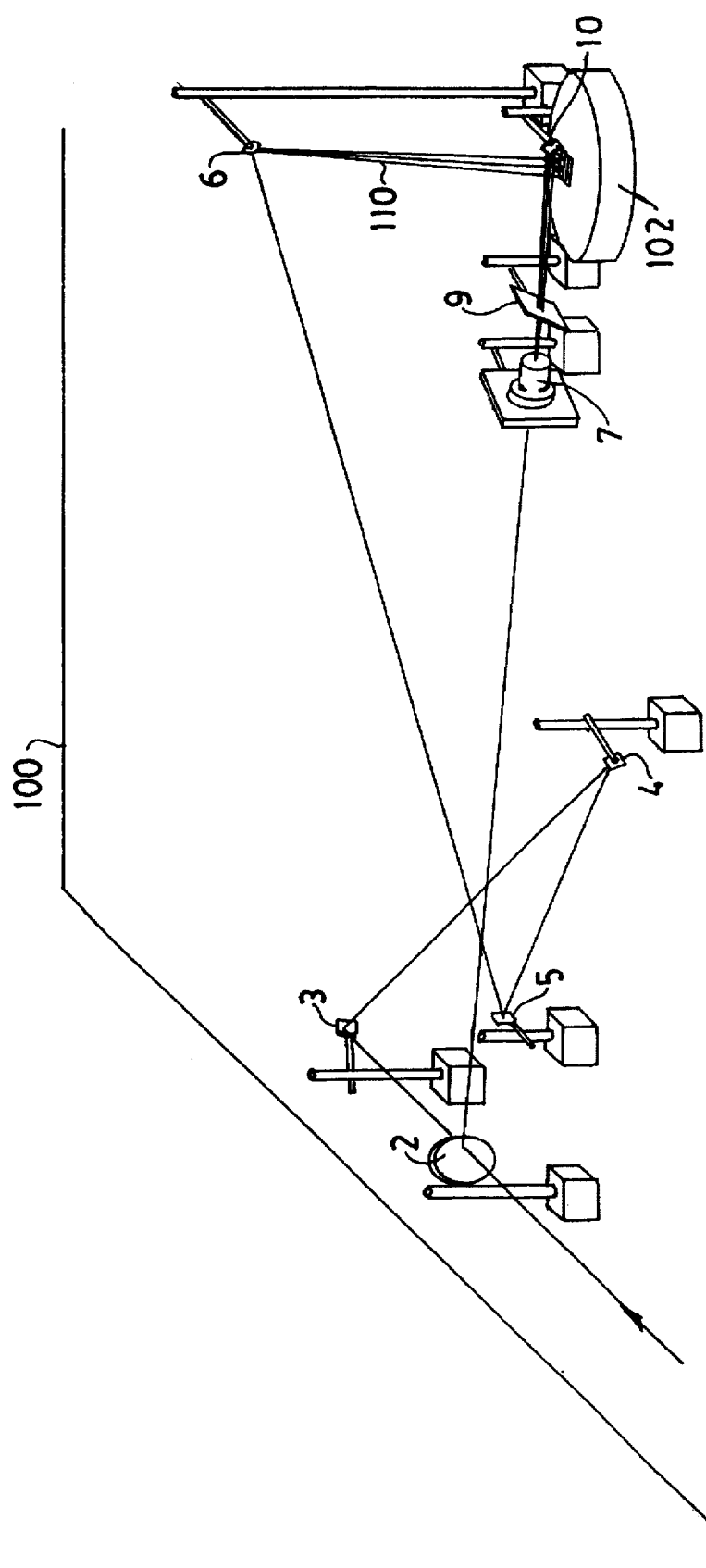
FIG. 7 is a perspective view of an arrangement for forming the holographic grating in the body of the collection optic shown in the previous figures.
Figure 8:
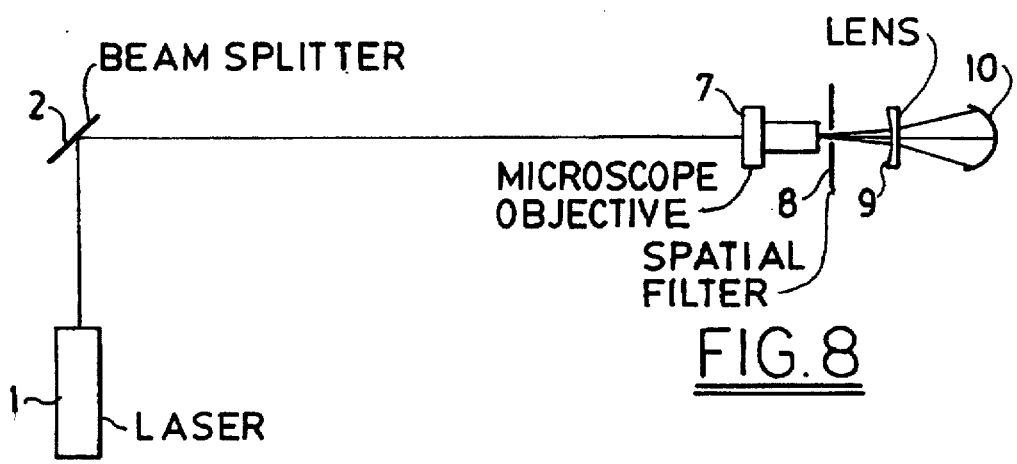
FIGS. 8 and 9 are, respectively, top views of the arrangement shown in FIG. 7 but showing separately the object beam and reference beam used in creating the holographic grating.
Figure 9:
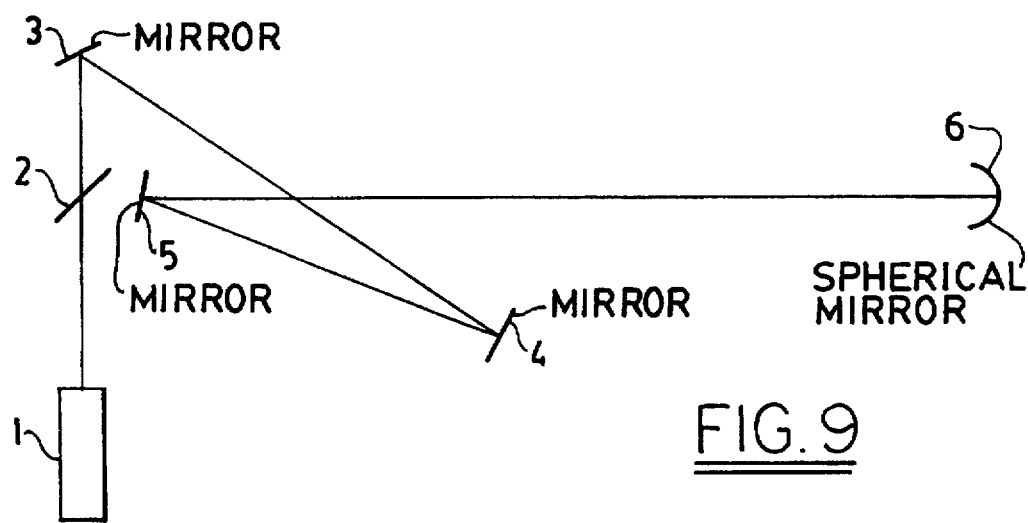
Figure 10:
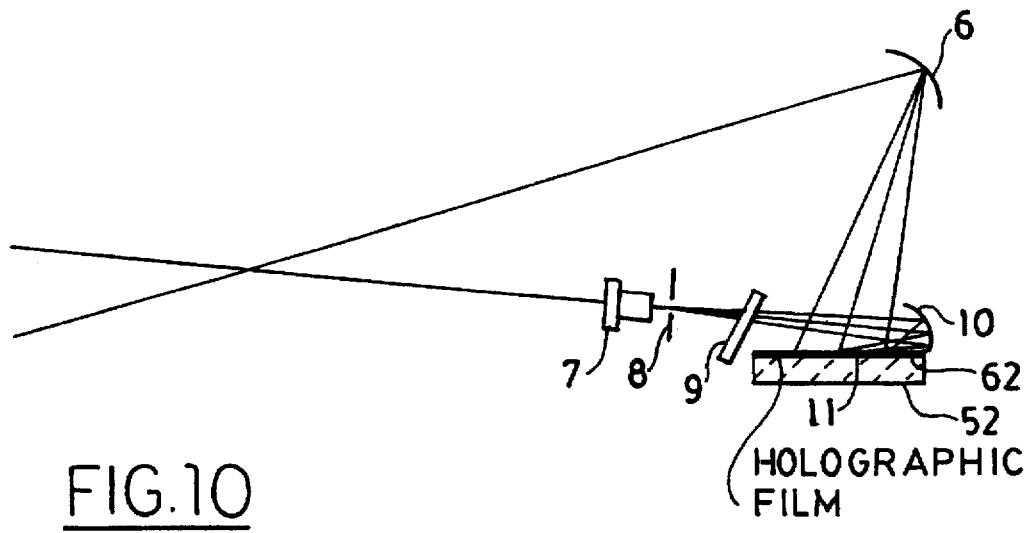
FIG. 10 is an enlarged side view of a portion of the arrangement shown in FIG. 7.

The construction of the hologram grating may be accomplished on an optical bench 100 such as shown in FIG. 7. A rotating stage 102 supports the substrate 52 coated with the photosensitive material layer 62 in which the hologram is to be formed. Over the hologram layer 62 is placed a mask that defines each of the 60° sectors. As the stage is rotated, each sector is exposed. The plate is moved diametrically along the stage to expose the sectors of the next hologram to the side of the one just exposed and fabricated. The optic is shaped and the notch is etched or laser cut after the hologram is formed. The cover plate 54 may be cut to the desired shape and the substrate plate 52 and hologram film 62 cut to match the cover plate 54.

The light used to make the hologram comes from a monochromatic source, such as an argon gas laser. The wavelength is 0.488 microns. The light is incident on a beam splitter 2 that splits the light into light for the object beam and light for the reference beam. The reference beam is bent at first, second, and third mirrors 3, 4 and 5.

The reference beam is then reflected by a spherical mirror 6 and exposes the emulsion (dichromated gelatin film). Although shown as a cone beam 110, the reference beam, as it is incident on the emulsion or photosensitive layer (the holographic film 11 in FIG. 10), is effectively collimated.

The object beam is transmitted to a 5-power microscope objective 7, a spatial filter 8, and a cylindrical lens 9 to a spherical mirror 10. This mirror 10 is only a segment of a sphere so that it can be close to the holographic film 11 (see especially FIGS. 8 and 10).

Figure 11:
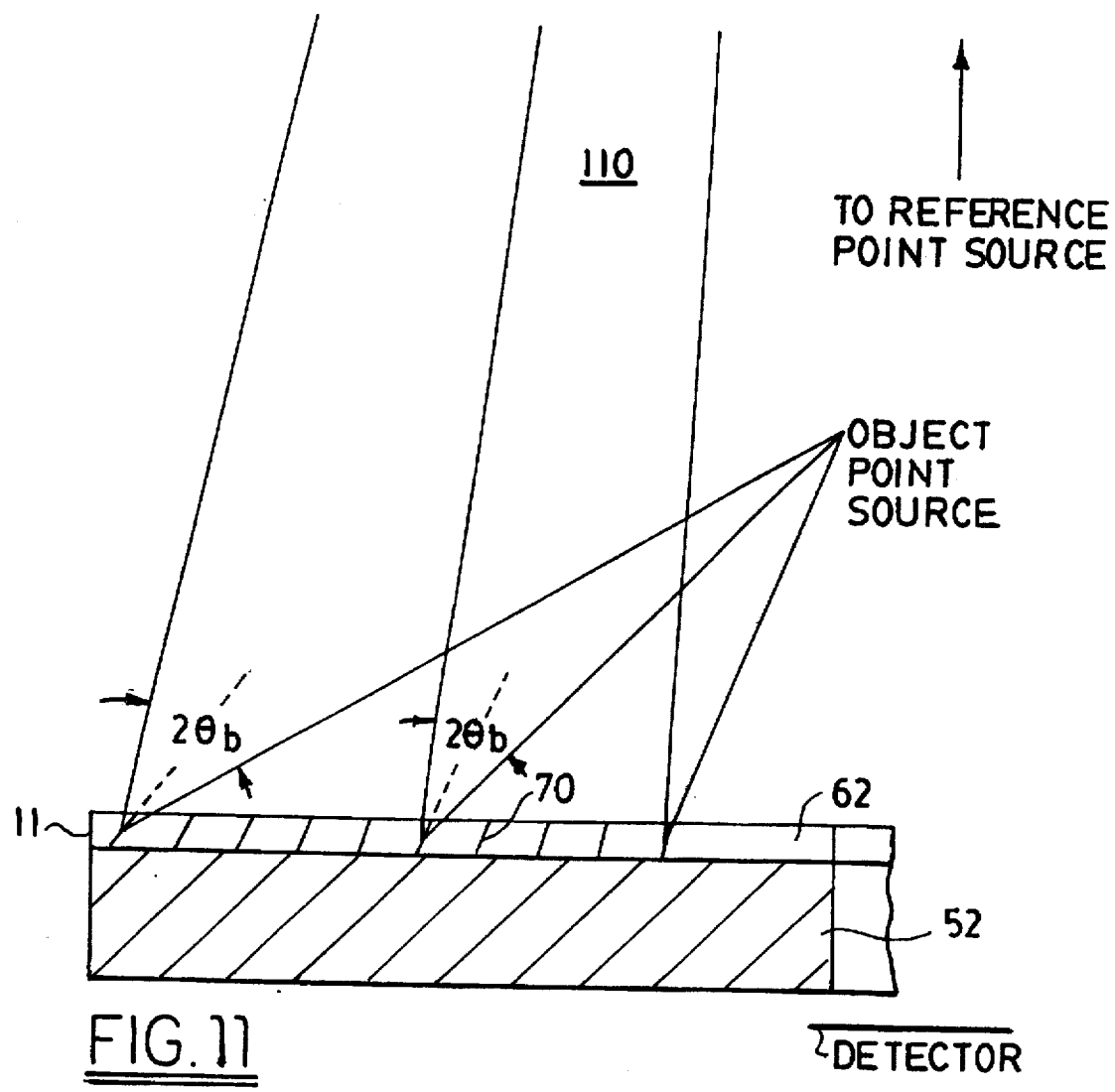
FIG. 11 is a schematic diagram illustrating how the exposure of the holographic film creates Bragg planes that vary in angle, decreasing in a direction toward the collection region.

The formation of the fringes or Bragg planes 70 is shown in FIG. 11. The object point source is the focus of the mirror 10. The generally collimated light (reference beam) thus interferes with generally circular, cones of object beam light, which provides the Bragg planes along the sectors in circular rings, at varying inclination, as shown by the circular dashed lines in FIG. 4. The spacing of the object point source and its height over the holographic film 11 determines the angle of the Bragg planes. This angle is effectively the bisector of rays from the reference source and from the point source and are indicated in the drawing as $2\theta_b$.

From the foregoing description it will be apparent that there has been provided improved optics and particularly collection optics, especially suitable for use in miniature bar code scan engines. Variations and modifications in the hereindescribed apparatus and additional applications therefor will undoubtedly suggest themselves to those skilled in the art. Accordingly, the foregoing description should be taken as illustrative and not in a limiting sense.

We claim:

1. A scan engine for scanning an optical beam that can contain data representing a symbol, collecting return light from said symbol and translating said return light into electrical signals representative thereof, the scan engine comprising:

a collection optic having a volume grating containing a plurality of annular coaxial rings forming a plurality of annular coaxial fringe planes oriented at at least one angle, which defines at least one Bragg angle, which fringe planes diffract said return light along different paths to propagate the light to a central common collection region, a photodetector at said region, and an essentially monochromatic source of light that diffracts at said Bragg angle, wherein said light source, grating, and optic are assembled in a unitary rotatable assembly to provide said beam, which scans over a field of view, and wherein the fringe planes are oriented at progressively varying angles, which define progressively varying Bragg angles, the return light diffracting at the varying Bragg angles.

2. The scan engine according to claim 1, wherein said assembly has a volume of less than about 1.25 cubic inch.

3. The scan engine according to claim 1, wherein said optic includes a body that transmits the light and said grating is a hologram grating.

4. The scan engine according to claim 1, wherein said paths pass through said grating at incident angles thereon different from said Bragg angles.

5. The scan engine according to claim 4, wherein said optic is a body having opposite surfaces, one of which is orientable to be transverse to the return light, and said paths include reflections at said surfaces.

6. The scan engine according to claim 1, further comprising flexures mounting the assembly for oscillatory movement about a pivot defined by said flexures to provide the scanning beam.

7. The scan engine according to claim 1, wherein said rings are spaced from each other by a common pitch distance.

8. The scan engine according to claim 1, wherein said optic includes a body that transmits the light, said body having two opposite surfaces, one of which is orientable transversely with respect to said return light, said body having first and second side-by-side sets of said annular rings defining first and second volume gratings each having the fringe planes at said progressively varying Bragg angles, said sets having center regions spaced from each other, and separate photodetectors in alignment with said center regions.

9. The scan engine according to claim 1, wherein said optic comprises a plate having two opposite surfaces, one of which is orientable to receive said return light incident thereto, said fringe planes being spaced from each other in a radial direction along said surfaces, and at least the other of said surfaces having a layer of reflective coating for guiding the propagation of said diffracted light along said paths in a direction through said grating and incident on said fringe planes at off Bragg angles.

10. The scan engine according to claim 9, wherein said one surface has a layer that transmits the light directed into said body via said one surface and reflects light directed out of said body, including light diffracted by said grating, reflected by said layer on said other surface, wherein the light reflected from the other surface is guided internally of said body through said grating to said one surface.

11. The scan engine according to claim 1, wherein said grating has first and second groups of said fringes, one of which varies in Bragg angle at a first rate and the other of which varies in Bragg angle at a second rate.

12. The scan engine according to claim 11, wherein one of said groups is closer to said region than the other of said groups.

13. The scan engine according to claim 12, wherein said optic is a plate having two opposite surfaces, wherein the return light is adapted to be incident on one of the two surfaces and the return light diffracted by said grating is adapted to be reflected off the other surface when the light is incident at less than a certain angle, and wherein said Bragg angles of both groups vary at such rates as to maintain light diffracted by said grating fringe groups incident on said other surface at less than said certain angle.

14. The scan engine according to claim 13, wherein said concentric annular coaxial rings of said first group of grating fringes are closer to said region than said concentric annular coaxial rings of said second group of grating fringes.

15. The scan engine according to claim 14, wherein said rings are spaced at the same radial intervals.

16. The scan engine according to claim 14, wherein the Bragg angles increase as the fringe planes are spaced radially farther from said region.

17. A scan engine according to claim 16, wherein the rings are spaced at the same radial intervals.

18. The scan engine according to claim 1, wherein the Bragg angles increase as the fringe planes are spaced radially farther from said region.

19. A collection optic for collecting essentially monochromatic light incident thereon over a certain range of light incident angles and guiding said light to a collection region for converting into electrical signals, the optic comprising a body defining a guide for said light, the body including a volume grating containing a plurality of annular coaxial rings forming a plurality of annular coaxial fringe planes oriented at at least one angle, which defines at least one Bragg angle, which fringe planes diffract said light along different paths to propagate the light to said collection region, wherein the fringe planes are oriented at progressively varying angles, which define progressively varying Bragg angles, and the essentially monochromatic light diffracts at the varying Bragg angles.

20. The optic according to claim 19, wherein said body is a plate having a volume of less than about one eighth cubic inch.

21. The optic according to claim 19, wherein said grating is a hologram grating.

22. The optic according to claim 19, wherein said paths pass through said grating at incident angles thereon different from said Bragg angles.

23. The optic according to claim 22, wherein said body has opposite surfaces, one of which is orientable to be transverse to the direction of light to be collected, and said paths include reflections at said surfaces.

24. The optic according to claim 19, wherein the Bragg angles increase as the fringe planes are spaced radially farther from said region.

25. The optic according to claim 24, wherein said rings are spaced from each other by a common pitch distance.

26. The optic according to claim 24, wherein said body transmits said essentially monochromatic light, said body having opposite surfaces, one of which is orientable transversely with respect to the direction of the light to be collected, said body having first and second side-by-side sets of said annular regions defining first and second volume gratings each having the fringe planes at said progressively varying Bragg angles, said sets having center regions spaced from each other.

27. The optic according to claim 19, wherein said body is a plate having two opposite surfaces, one of which is orientable with respect to a field of view to receive said light incident thereto, said fringe planes being spaced from each other in a radial direction along said surfaces, and at least the other of said surfaces having a layer of reflective coating for guiding the propagation of said diffracted light along said paths in a direction through said grating and incident on said fringe planes at off Bragg angles.

28. The optic according to claim 27, wherein said one surface has a layer that transmits said essentially monochromatic light directed into said body and reflects the light directed out of said body, including the light diffracted by said grating, reflected by said reflective layer on said other surface, wherein the light reflected from the other surface is guided internally of said body through said grating to said one surface.

29. The optic according to claim 19, wherein said grating has first and second groups of said fringes, one of which varies in Bragg angle at a first rate and the other of which varies in Bragg angle at a second rate.

30. The optic according to claim 29, where one of said groups is closer to said region than the other of said groups.

31. The optic according to claim 30, wherein said optic is a plate having two opposite surfaces, where the light is adapted to be incident on one of the two surfaces and the light diffracted by said grating is adapted to be reflected off the other surface when the light is incident at less than a certain angle, and said groups of Bragg angles varying at such rates as to maintain the light diffracted by said groups incident on said other surface at less than said certain angle.

32. The optic according to claim 31, wherein said concentric annular coaxial rings of said first group of grating fringes are closer to said region than said concentric annular coaxial rings of said second group of grating fringes.

33. The optic according to claim 32, wherein said rings are spaced at the same pitch.

* * * * *